United States Patent
Xu et al.

(10) Patent No.: US 10,305,149 B2
(45) Date of Patent: May 28, 2019

(54) ELECTROCHEMICAL STACK DIRECT HEAT TO ELECTRICITY GENERATOR

(71) Applicant: Massachusetts Institute of Technology, Cambridge, MA (US)

(72) Inventors: Lin Xu, Cambridge, MA (US); Patrick Alan Linford, Cambridge, MA (US); Carl Vernette Thompson, II, Acton, MA (US); Yang Shao-Horn, Newton, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 15/973,770

(22) Filed: May 8, 2018

(65) Prior Publication Data

US 2018/0323480 A1 Nov. 8, 2018

Related U.S. Application Data

(60) Provisional application No. 62/503,001, filed on May 8, 2017.

(51) Int. Cl.
  *H01M 10/0525* (2010.01)
  *H01M 10/44* (2006.01)
  *H01M 10/42* (2006.01)

(52) U.S. Cl.
  CPC ..... *H01M 10/441* (2013.01); *H01M 10/0525* (2013.01); *H01M 10/425* (2013.01); *H01M 10/443* (2013.01); *H01M 2010/4271* (2013.01)

(58) Field of Classification Search
  None
  See application file for complete search history.

(56) References Cited

U.S. PATENT DOCUMENTS 6,838,208 B2    1/2005  Decrosta
2013/0271089 A1  10/2013  Yazami et al.
(Continued)

OTHER PUBLICATIONS

Yang et al., "Charging-free electrochemical system for harvesting low grad thermal energy"; PNAS, vol. 11, No. 48; Publication [online], Dec. 4, 2014 [retrieved Jun. 30, 2018], Retrieved from the Internet: <URL: http://www.pnas.org/content/111/48/17011.short>; pp. 17011-17016.

(Continued)

*Primary Examiner* — Tracy M Dove
(74) *Attorney, Agent, or Firm* — Sunstein Kann Murphy & Timbers LLP

(57) ABSTRACT

A thermogalvanic electrochemical system includes two battery sources connected together in a switchable circuit to provide electric current to an electrical load in the circuit. The battery sources are located in a thermal environment having a varying temperature, and each battery source has a corresponding electrical potential that varies with temperature of the thermal environment. A power management processor operates the circuit to: form a closed circuit at a first temperature with current flow from a first battery source through the electrical load to a second battery source until reaching a first thermal equilibrium, and then form an open circuit, then form a closed circuit at a second temperature with current flow from the second battery source through the electrical load to the first current source until reaching a second thermal equilibrium, and then form an open circuit.

12 Claims, 10 Drawing Sheets

(56) References Cited

U.S. PATENT DOCUMENTS

| | | |
|---|---|---|
| 2015/0099150 A1 | 4/2015 | Lee et al. |
| 2016/0336623 A1 | 11/2016 | Nayar et al. |
| 2017/0288253 A1 | 10/2017 | Chueh et al. |
| 2018/0119680 A1* | 5/2018 | Jones .................. F03G 7/05 |

OTHER PUBLICATIONS

International Searching Authority—US, International Search Report and Written Opinion, International Application No. PCT/US18/31527, dated Jul. 30, 2018, 16 pages.

* cited by examiner

ELECTROCHEMICAL STACK DIRECT HEAT TO ELECTRICITY GENERATOR

This application claims priority from U.S. Provisional Patent Application 62/503,001, filed May 8, 2017, which is incorporated herein by reference in its entirety.

TECHNICAL FIELD

The present invention relates to electrochemical systems that use thermogalvanic effect to convert heat differences into electrical work.

BACKGROUND ART

Currently, traditional primary and secondary batteries are the primary sources of power for wireless sensors such as those that are used in the internet of things and other industrial and agricultural applications. These sensors, however, require charging or replacing the batteries with frequencies that range from daily to bi/tri-monthly for some ultra-low power sensors. In order to decrease the frequency of changing batteries, system capabilities are often compromised in order to operate at ultra-low power.

It also is known that electrochemical cells can vary their electrochemical equilibrium with temperature, a property referred to as the thermogalvanic effect. This can be expressed in terms of a temperature coefficient, a, given in units of volts per degrees kelvin (V/K). Electrochemical materials and redox couples with high temperature coefficients are used in thermogalvanic cells. See, e.g., Lee, Seok Woo, et al. "An electrochemical system for efficiently harvesting low-grade heat energy." Nature communications 5 (2014): 3942, http://doi.org/10.1038/ncomms4942; Yang, Yuan, et al. "Charging-free electrochemical system for harvesting low-grade thermal energy." *Proceedings of the National Academy of Sciences* 111.48 (2014): 17011-17016. http://doi.org/10.1073/pnas.1415097111; Agar, JN, *Thermogalvanic Cells*, Adv. Electrochem. Eng., 3, 31 (1964); all of which are incorporated herein by reference in their entireties. These cells require a temperature gradient in order to operate. But in the context of wireless sensors, it can be difficult to find places where sensors can both collect the desired data type and access a temperature gradient. In addition, the requirements of a temperature gradient often result in additional cooling fins, which can dramatically increase the size of sensor platforms, thereby decreasing their effectiveness and desirability.

Thermally Regenerative Electrochemical Cycle (TREC) cell systems have been demonstrated (by Lee above) to convert thermal energy directly into useful electrical work. But their arrangement requires the batteries to be charged and discharged at different temperatures in order to access the TREC effects. Using similar principles, Yang (cited above) demonstrated a charge-free system for power generation which takes advantage of cyclic temperature differences to create useful electrical work. However this system requires exotic and expensive materials (Prussian blue and ferro/ferricyanide). It also works using a single electrochemical cell.

Lithium-ion battery materials also undergo the Seebeck effect (i.e., a temperature difference between two dissimilar electrical materials produces a voltage difference between the two materials). Two materials with large Seebeck coefficient vs lithium (1.7 $mVK^{-1}$) are $Li_xCoO_2$ (LCO) at 2.1 $mVK^{-1}$ and $Li_xV_2O_5$ (LVO) at 1.2 $mVK^{-1}$. These cells can be used in a TREC arrangement to recapture heat energy.

SUMMARY

Embodiments of the present invention are directed to a thermogalvanic electrochemical system configured to convert environmental heat differences into electrical work. Two battery sources are connected together in a switchable circuit to provide electric current to an electrical load in the circuit. The battery sources are located in a thermal environment having a varying temperature, and each battery source is characterized by a corresponding electrical potential that varies by thermogalvanic effect with temperature of the thermal environment. A power management processor employing at least one hardware implemented computer processor executes program instructions to operate the switchable circuit to: (a) form a closed circuit at a first temperature with current flow from a first battery source through the electrical load to a second battery source until reaching a first thermal equilibrium, (b) form an open circuit without current flow through the electrical load after reaching the first thermal equilibrium, (c) form a closed circuit at a second temperature with current flow from the second battery source through the electrical load to the first current source until reaching a second thermal equilibrium, and (d) form an open circuit without current flow through the electrical load after reaching the second thermal equilibrium.

Embodiments of the present invention also are directed to a related computer-implemented method employing at least one hardware implemented computer processor for operating a thermogalvanic electrochemical system to convert environmental heat differences into electrical work. The at least one hardware processor is operated to execute program instructions to control a switchable circuit connecting together two battery sources so as to provide electric current to an electrical load in the circuit. The battery sources are located in a thermal environment having a varying temperature, and each battery source is characterized by a corresponding electrical potential that varies by thermogalvanic effect with temperature of the thermal environment. Controlling the switchable circuit includes: (a) forming a closed circuit at a first temperature with current flow from a first battery source through the electrical load to a second battery source until reaching a first thermal equilibrium, (b) forming an open circuit without current flow through the electrical load after reaching the first thermal equilibrium, (c) forming a closed circuit at a second temperature with current flow from the second battery source through the electrical load to the first current source until reaching a second thermal equilibrium, and (d) forming an open circuit without current flow through the electrical load after reaching the second thermal equilibrium.

In further specific embodiments, the thermal environment may comprise a single common thermal environment around both battery sources with a common environment temperature varying over time. Alternatively, the thermal environment may comprise a dual temperature environment with each battery source located in its own separate temperature environment, wherein the temperatures in each separate temperature environment vary over time separately and independently of the other temperature.

The battery sources may comprise charge-free lithium ion batteries and/or may be configured to operate as Thermally Regenerative Electrochemical Cycle (TREC) cells or charge-free cells.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Various embodiments of the present invention are directed to dual stack thermogalvanic systems that employ two stacks of electrochemical cells to convert heat energy directly into electrical energy. This results in a power source that harnesses ambient environmental energy and converts it to useful work, enabling wireless sensors that can be truly autonomous.

As an initial matter, it is understood that the efficiency for direct heat to electricity conversion is governed by the equation:

$$\eta = P/[\kappa A(\partial T/\partial x) + IT\Delta S/(nF)]$$

While that equation is accurate, it is not altogether for making comparisons because of the complication of the process happening inside the cell electrolyte. In order to make direct comparison between thermogalvanic cells and thermoelectric devices, the thermoelectric figure of merit, ZT, is usually used, where T is the temperature in absolute scale and $Z = S^2\sigma/\kappa$, where S is the Seebeck coefficient, $\sigma$ is ionic conductivity of the electrolyte, and $\kappa$ is the thermal conductivity of the cell. Electrochemical cells that take advantage of cyclic heat loading are governed by the equation $\eta = \eta_{Carnot}/(1 + \eta_{Carnot}/Y)$ n which $Y = \alpha Q_c/C_p$ where $C_p$ is the specific heat of the whole cell, $Q_c$ is the amount of charge throughout the cycle and $\alpha$ is the temperature coefficient of the cell. Assuming that the source of heat is waste heat or infinite, then $C_p$ can be changed to only reflect the specific heat of the active materials.

Given the foregoing, embodiments of the present invention are directed to a thermogalvanic electrochemical system configured to convert environmental heat differences into electrical work. FIGS. 1A-1D show a simplified schematic where two battery sources are connected together in a switchable circuit to provide electric current to an electrical load in the circuit. These battery sources are located in a thermal environment that exhibits a varying temperature over time, and each battery source is characterized by a corresponding electrical potential that varies by thermogalvanic effect with the temperature of the thermal environment. For example, the battery sources may specifically be charge-free lithium ion batteries and/or may be configured to operate as Thermally Regenerative Electrochemical Cycle (TREC) cells or charge-free cells. A power management processor employing at least one hardware implemented computer processor executes program instructions to operate the switchable circuit as shown in FIGS. 1A-1D for a charging-free system.

Figure 1A:
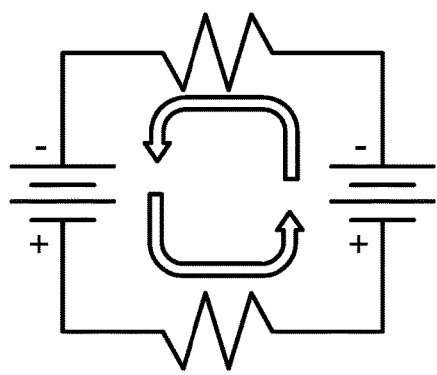
FIGS. 1A-1D illustrate the principle of operation of embodiments of the present invention.
Figure 1B:
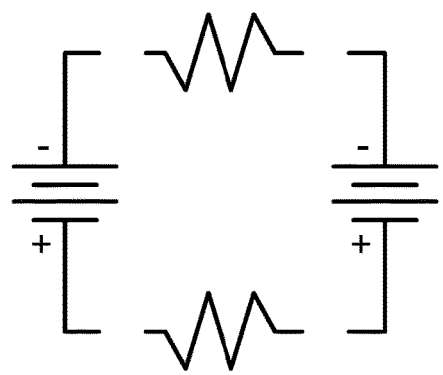
Figure 1C:
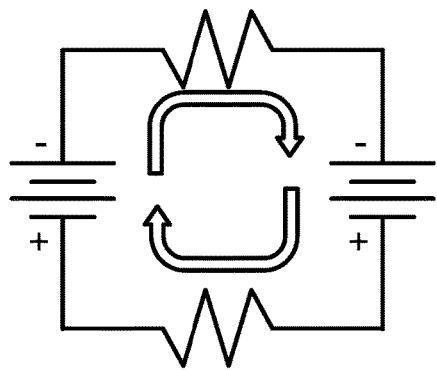
Figure 1D:
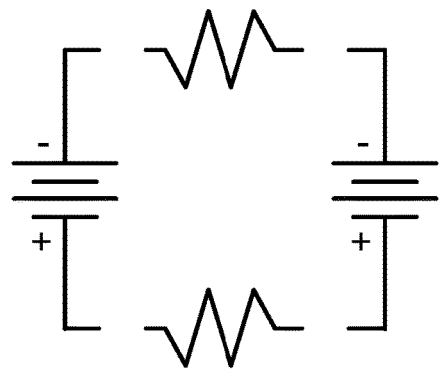
Figure 2:
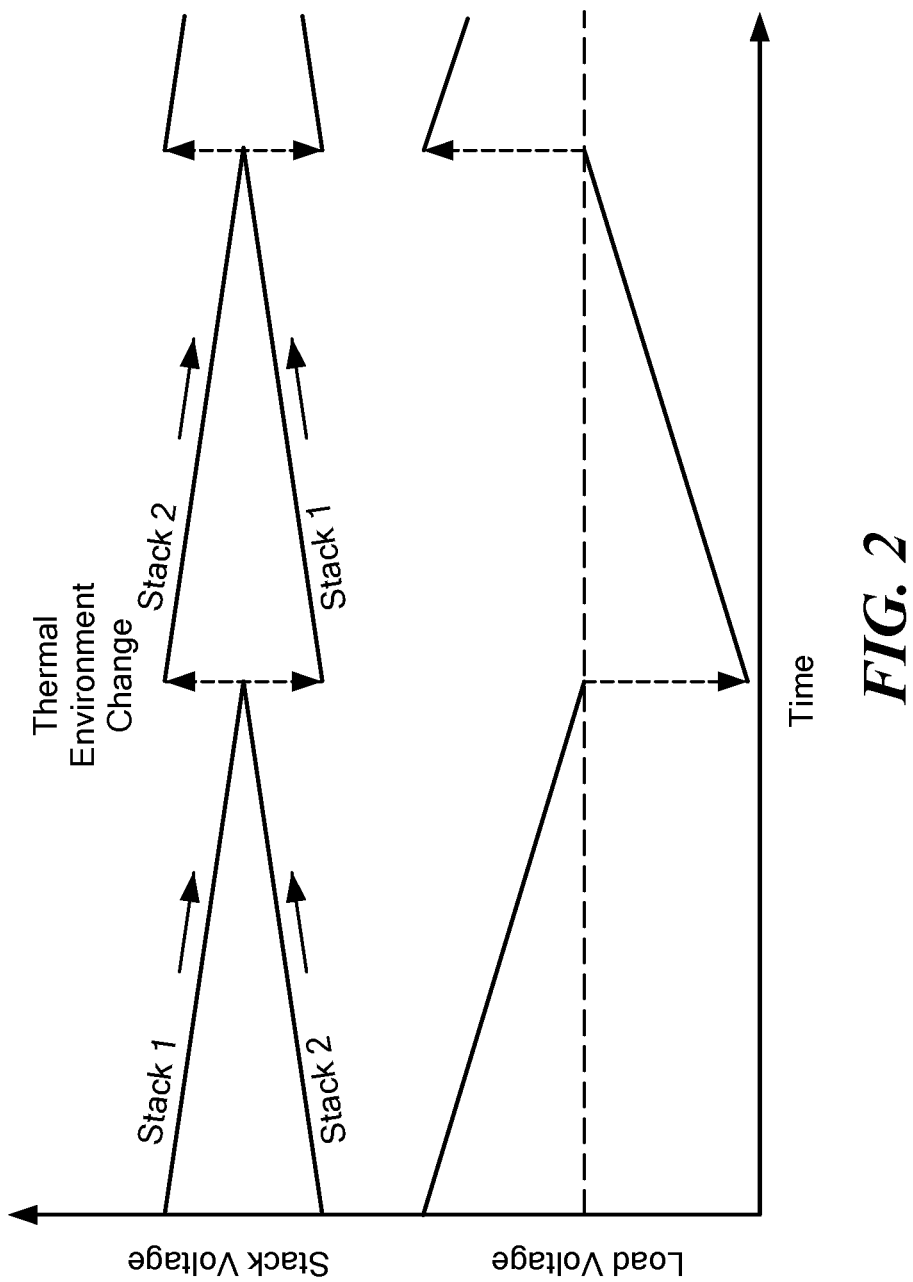
FIG. 2 is a graph showing how voltages vary over time in embodiments of the present invention.

Initially, when the thermal environment is at a first temperature, the battery sources have different potentials. Then the switchable circuit is operated to form a closed circuit as shown in FIG. 1A. The battery sources will spontaneously attempt to reach equilibrium, creating current flow from a first battery source through the electrical load to a second battery source until reaching a first thermal equilibrium. Then, after reaching the first thermal equilibrium, an open circuit is created without current flow through the electrical load, as shown in FIG. 1B. In this open circuit configuration, the temperature in the thermal environment changes to a second temperature and the thermogalvanic effect will change the potential of each battery source, and a new net voltage will be realized between the battery sources. Then a closed circuit is formed again with current flow in the opposite direction from the second battery source through the electrical load to the first current source until reaching a second thermal equilibrium, as shown in FIG. 1C. After reaching after reaching a second thermal equilibrium, then as shown in FIG. 1D, an open circuit is again formed without current flow through the electrical load. FIG. 2 is graph showing the theoretical voltage of each battery source ("stack") and the difference in potential seen across the electrical load during a thermal cycle.

As explained below, this process of thermal cycling can be exploited in and a single-temperature thermal environment that forms a single common thermal environment around both battery sources with a common environment temperature varying over time. Or the thermal environment may specifically be a dual-temperature thermal environment with each battery source located in its own separate temperature environment, wherein the temperatures in each separate temperature environment vary over time separately and independently of the other temperature.

Dual Temperature Regime Charge-Free System

Figure 3A:
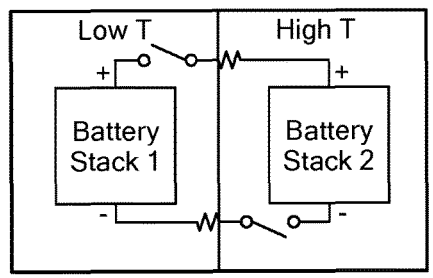
FIGS. 3A-3F show operation over time of a simplified embodiment of the present invention.
Figure 3B:
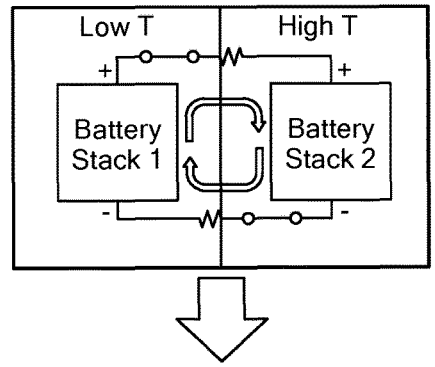
Figure 3F:
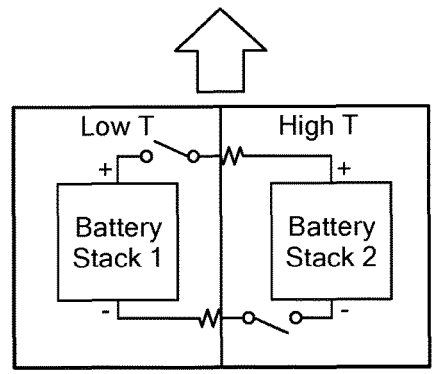
Figure 3C:
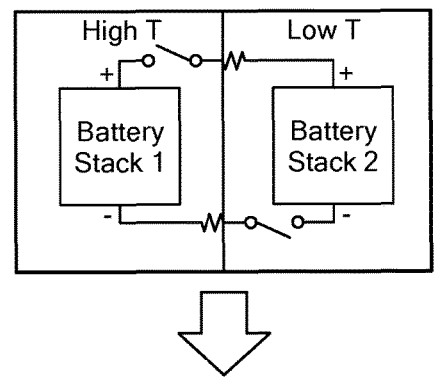
Figure 3E:
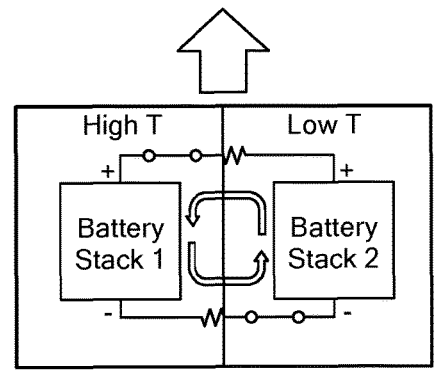
Figure 3D:
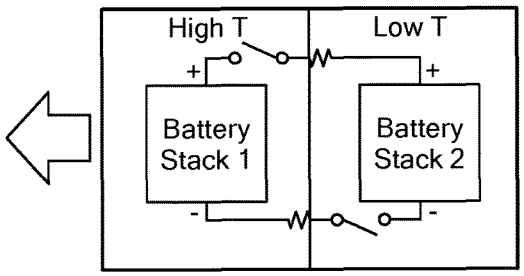

Traditional secondary batteries have known charge and discharge curves. When the entire cell temperature is changed, the voltage of the cell changes but the state of charge does not. This principle means that two identical cells that are held at different temperatures will have different voltages. If the temperature coefficient is sufficiently large, the difference in voltage can be used to power wireless sensors. Battery sources in different temperature environments ("Battery Stack 1" and "Battery Stack 2" in FIGS. 3A-3F) will discharge into each other and thereby can drive work at an electrical load between them. The battery sources in FIGS. 3A-3F are assumed to be two identical electrochemical stacks, which can be a single battery or multiple batteries connected in series; however, each electrochemical stack is held at a different thermal environment temperature. At the start of the cycle (FIG. 3A), the voltage between the battery sources is the product of the temperature coefficient of the full stack and the temperature difference. When the circuit switches are closed (FIG. 3B), current flows through the electrical load from Battery Stack 1 to Battery Stack 2 and causes a change in the state of charge in each of the electrodes until the electrochemical cells reach a system equilibrium. At some point in time after that, the circuit switches are opened and the thermal environment temperatures change (FIG. 3C), and the thermal conditions of the two battery sources change to reach a new opposite thermal equilibrium (FIG. 3D). Due to the thermogalvanic effect, a voltage will again develop between the two battery sources so that when the circuit switches are closed again (FIG. 3E), current will flow in the opposite direction from Battery Stack 2 to Battery Stack 1 until system equilibrium is again achieved. Finally, the circuit switches are again opened, and the thermal environment conditions return to their original state (FIG. 3F), and the thermal conditions of the two battery sources change to their original thermal equilibrium (FIG. 3A). This process is a full thermal cycle with little expected loss in the system. This means that the system should be highly cyclable, provided the battery sources are highly reversible across this small change in charge.

Example 1: LiCoO$_2$ (LCO) Dual Cell

Resistance values for the electrical load can be chosen to match the desired power output per period. In a first experimental example with a LiCoO$_2$ (LCO) Dual Cell system, load resistances of 100Ω and 1000Ω were chosen to determine the trend of power and resistance for the circuit. The battery sources were placed in 10° C. and 40° C. thermal environments, and the cells were swapped in open circuit configuration. Ten minutes were allowed after switching the cells to allow thermal equilibrium.

Figure 4A:
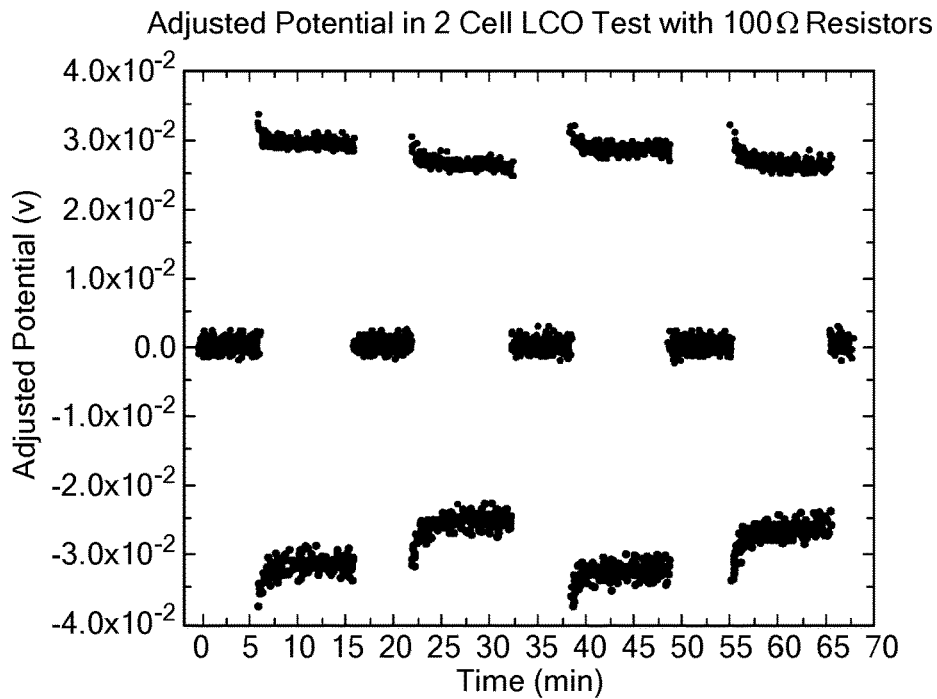
FIGS. 4A-4F show various waveform measurements for a set of experiments for one specific embodiment of the present invention.
Figure 4B:
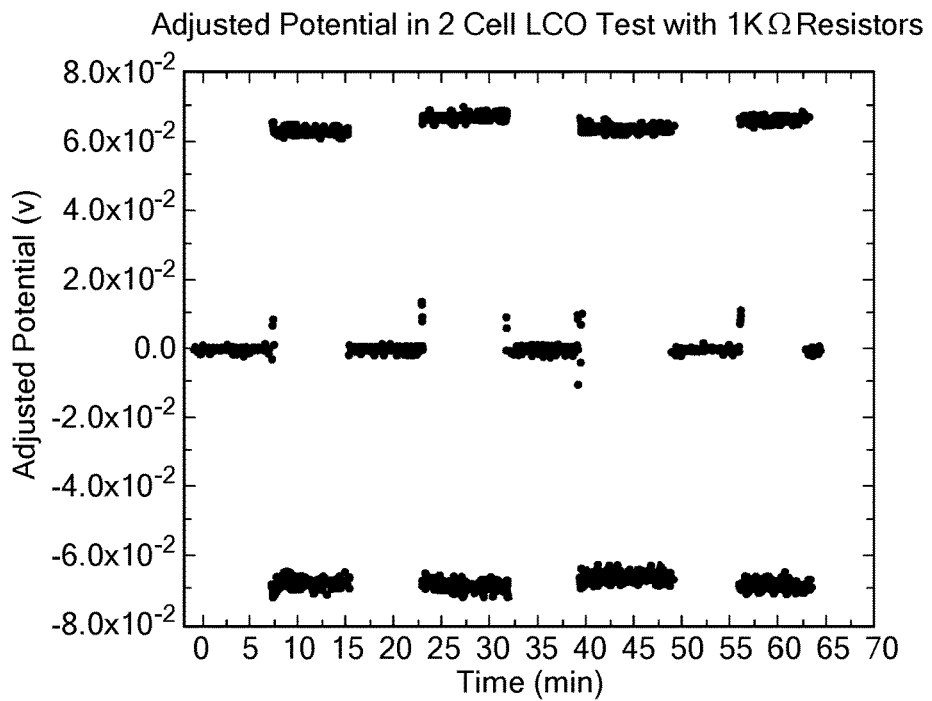

Current value was determined using Ohm's law and direct measurement of the drop in potential across the load resistor. FIG. 4A shows a graph of adjusted potential (V) for two thermal cycles in a 2 cell LCO circuit with 100Ω load resistor, and FIG. 4B shows the same thing for a 2 cell LCO circuit with 1000Ω load resistor. The orange values at the top of those graphs correspond to positive terminals, and the purple values correspond to the negative terminals. An overpotential of nearly 3 mV is observed in the 100Ω circuit caused by the higher current. These short term tests demonstrate that the circuit is cyclable.

Figure 4C:
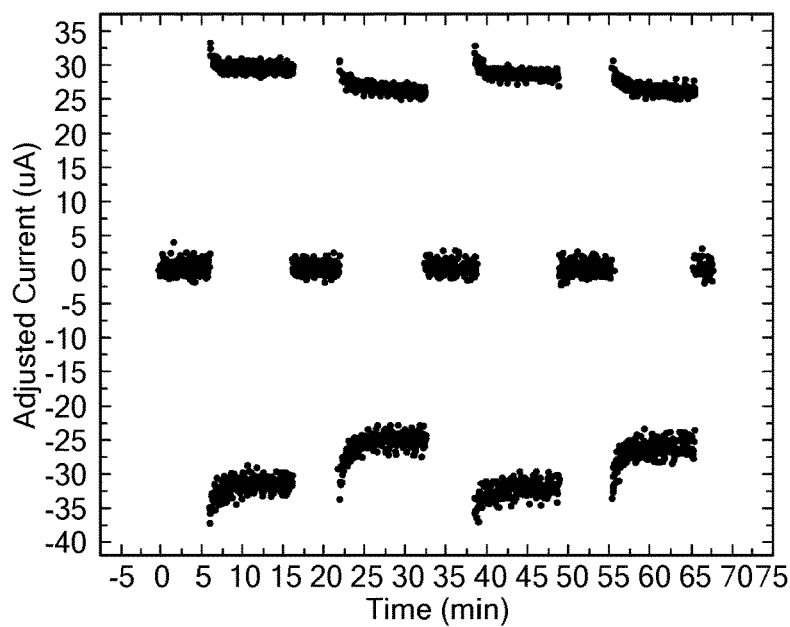
Figure 4D:
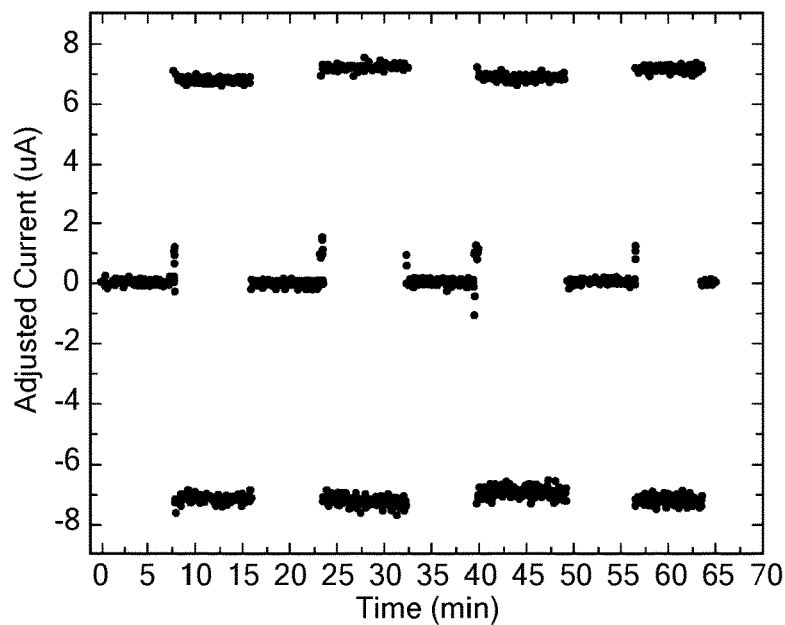

FIG. 4C shows a graph of adjusted current (μW) for two thermal cycles in a 2 cell LCO circuit with 100Ω load resistor, and FIG. 4D shows the same thing for a 2 cell LCO circuit with 1000Ω load resistor. The orange values at the top of those graphs correspond to positive terminals, and the purple values correspond to the negative terminals. These cells exhibit comparable current across each resistor in the range of 30 μA and 7 μA (100Ω and 1000Ω respectively) during short term LCO tests. The 1000Ω circuit is nearly 5 times lower, despite 10 times the resistance due to lower overpotential.

Figure 4E:
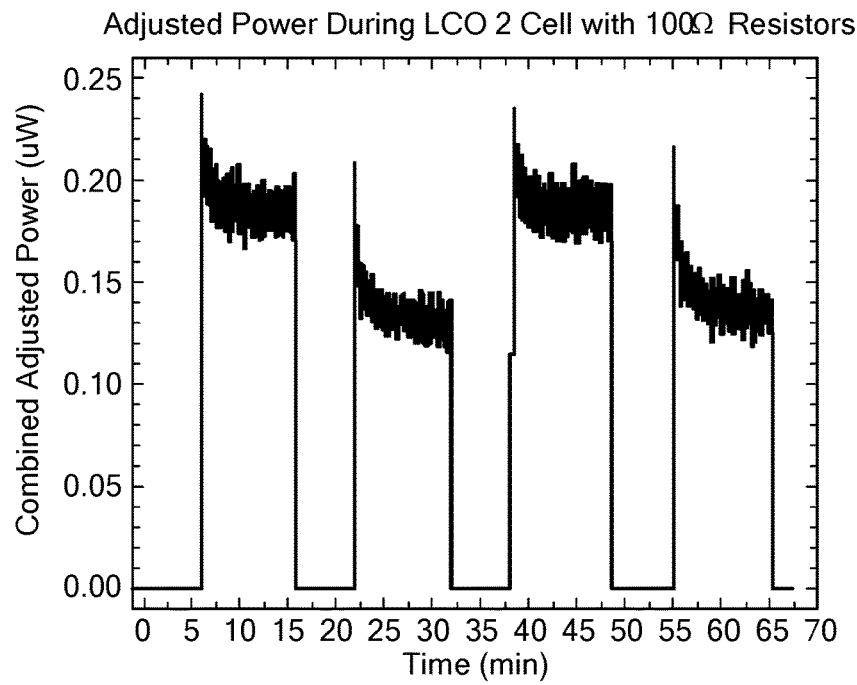
Figure 4F:
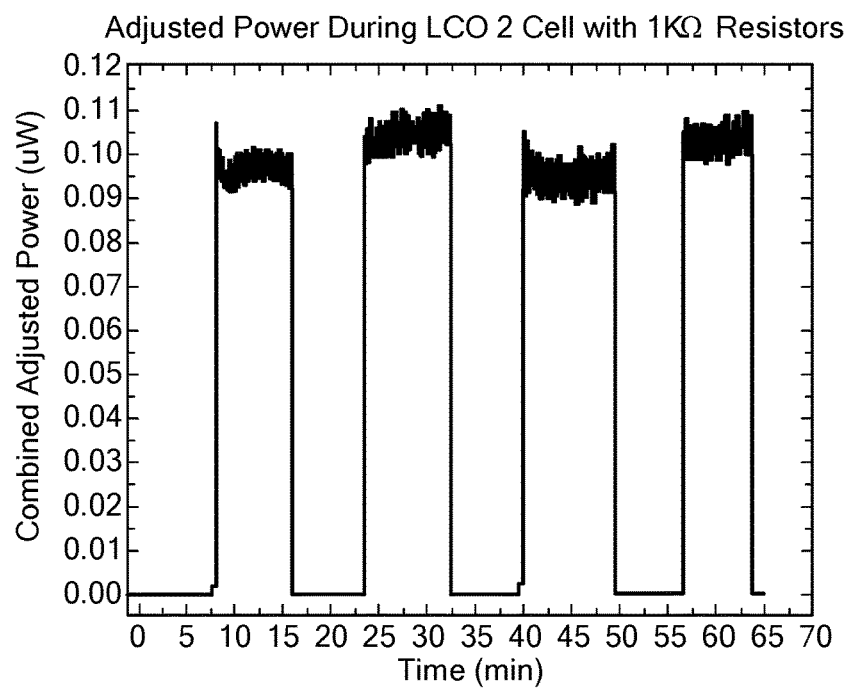

FIG. 4E shows a graph of adjusted power (μW) for two thermal cycles in a 2 cell LCO circuit with 100Ω load resistor, and FIG. 4F shows the same thing for a 2 cell LCO circuit with 1000Ω load resistor. Overpotential in the 100Ω circuit limits power to ~20 uW, despite more than four times the current. The higher overpotential in the 100Ω circuit results in only twice the power. Real systems will need to allow the cells to reach equilibrium. Long term tests produced an exponential decay of the current not present during the short term tests while the cells reach equilibrium.

Example 2: LiV$_2$O$_5$ (LVO) Dual Cell

A second experimental example used a LiV$_2$O$_5$ (LVO) Dual Cell system where The cells were Li$_x$V$_2$O$_5$/Li—Al (LVO) commercial cells (Panasonic VL2020). Like the LCO system, resistance values for the circuit can be chosen to match the desired power output per period. Resistances of 100Ω and 1000Ω were chosen to determine the trend of power and resistance for the circuit. Cells were placed in 10° C. and 40° C. temperature thermal environments, and the cells were swapped in open circuit configuration. Ten minutes were allowed after switching the cells to allow thermal equilibrium.

Figure 5A:
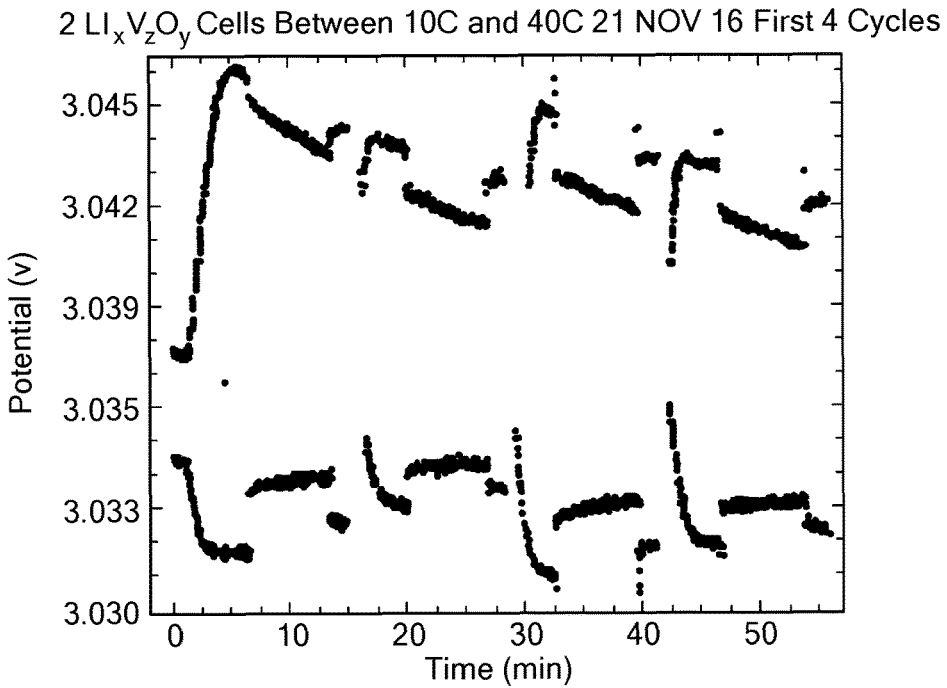
FIGS. 5A-5D show various waveform measurements for a set of experiments for another specific embodiment of the present invention.

FIG. 5A shows a graph of adjusted potential (V) over time where the red numbers correspond to estimation of the state of charge when comparing OCV values to GITT measurements of the cell, and black numbers correspond to calculated changes to the state of charge from the calculated current changes. These number correspond well, indicating the change in voltage represents a change in the state of charge. As can be seen, the system is highly cyclable, with overall decrease in cell potential on the same order as self-discharge of the system.

Figure 5B:
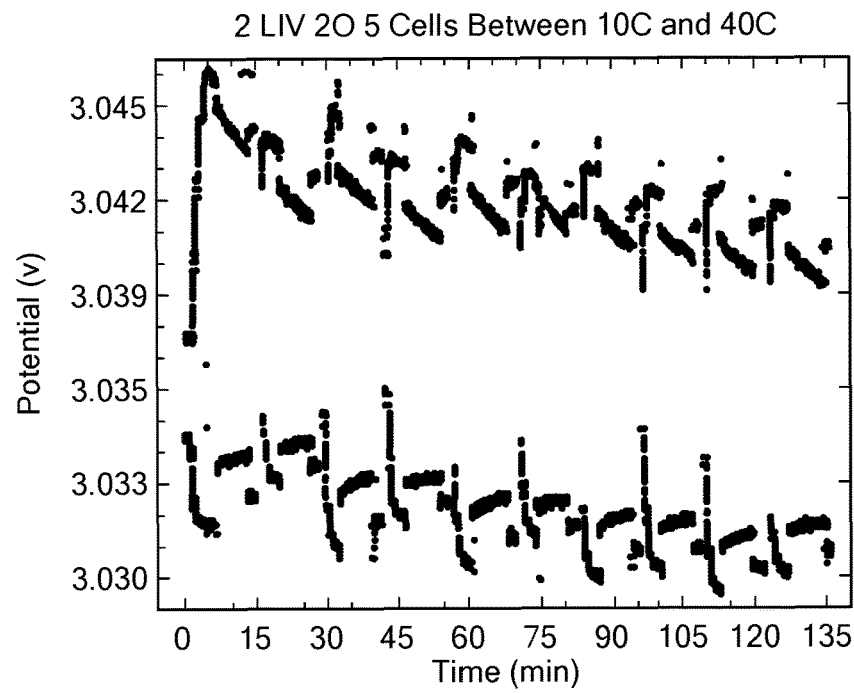

FIG. 5B shows a graph of potentials of the dual temperature LVO system over 10 cycles. The decay in potential across the experiment is comparable to the observed self-discharge rate at 40° C. for the cell, and order of magnitude smaller than the change in current through the resistors. Even over many cycles, the LVO cells demonstrate temperature energy harvesting.

Figure 5C:
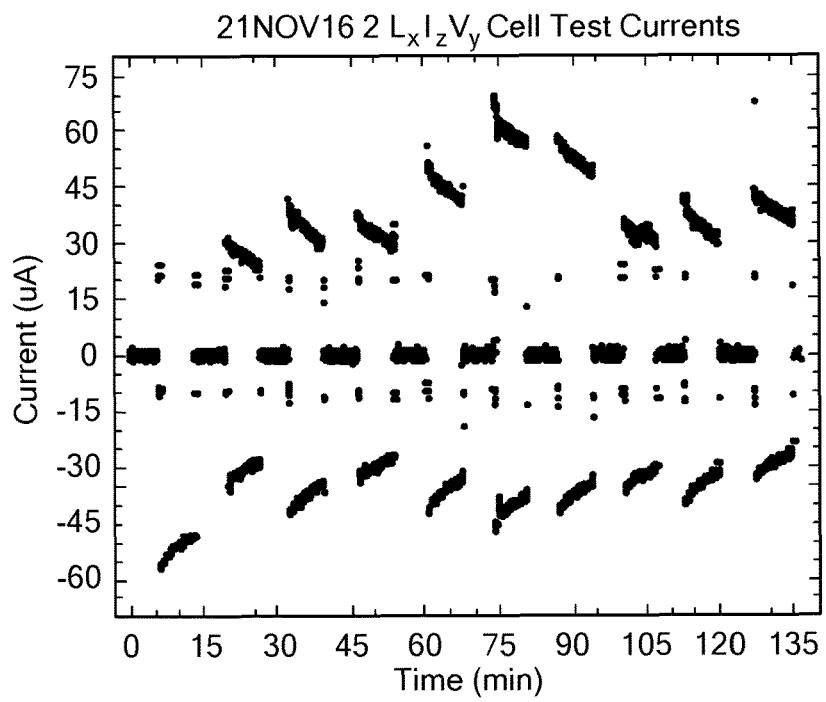
Figure 5D:
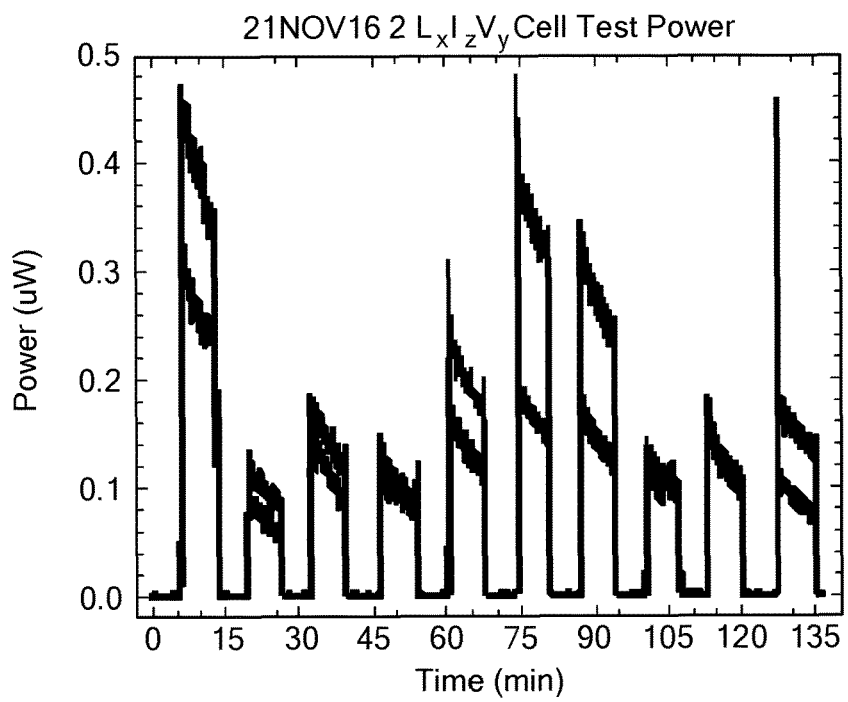

FIGS. 5C and 5D show current and power respectively of the system using measurements of the two electrodes that were conducted using separate floating grounds, which introduced an error in the measurement of up to 1 mV, which explains the difference in current between the electrodes.

Example 3: Single Temperature Charge-Free System

A third experimental example used a single common thermal environment for both battery sources. The single temperature system, unlike the dual temperature system, cannot use two of any cell. Instead, the cells need to be of equal open circuit voltage, while the cell should possess different temperature coefficients. The larger the difference in the temperature coefficients, the better, and ideally they would have different signs. If the cells begin at an average temperature at the same voltage, then closing the circuit would result in no current. Increasing the temperature of the cells creates a net potential. If the circuit is closed, then a current can be observed. Cooling the cells to a cold temperature then creates a new potential. Closing the circuit then drives current in the other direction. Both of these actions are spontaneous (i.e. do not require external charging).

Figure 6A:
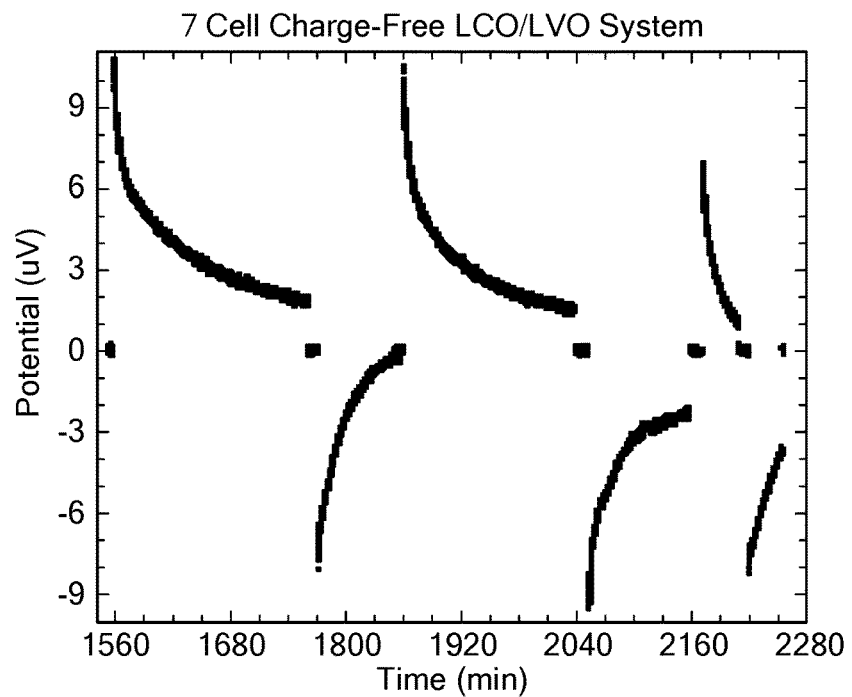
FIGS. 6A-6C show various waveform measurements for a set of experiments for another specific embodiment of the present invention.
Figure 6B:
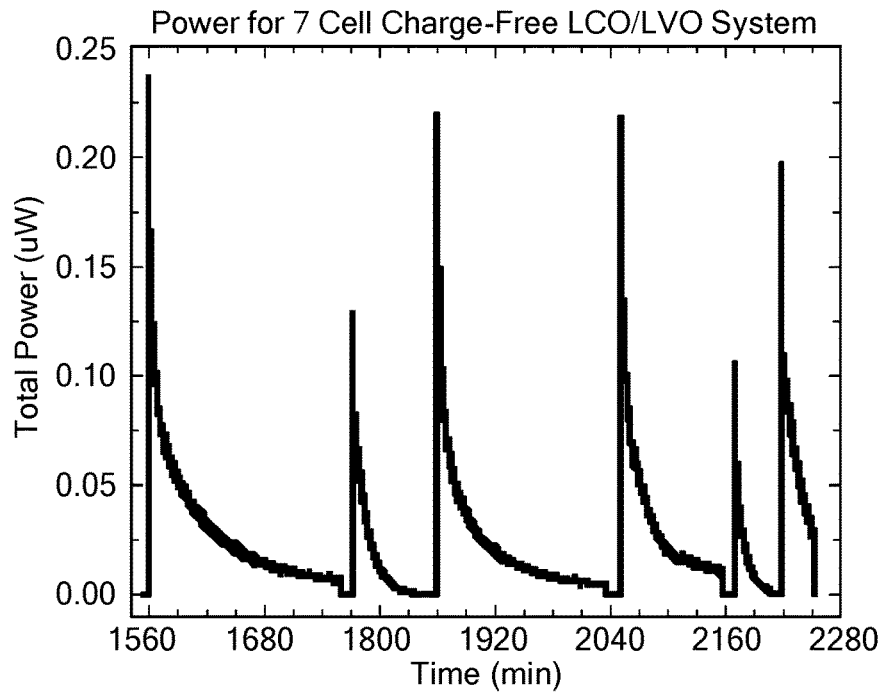

A 7-cell system was constructed by wiring stacks of homemade LCO/Li (LCO) cells and Li$_x$V$_2$O$_5$/Li—Al (LVO) from Panasonic cells (VL2020). 1000Ω resistors were set between the positive and negative terminals of the stacks to minimize the overpotential of the system. Measurement of the potential drop across the resistor connecting the positive terminals are displayed in FIG. 6A. The temperature of the system is marked as well as OCV measurements of each stack while in the open circuit configuration. As shown in FIG. 6B, The power for this system reaches equilibrium quickly, within a few hours. It reaches peak values over 0.2 μW, rapidly decaying to just a few tenths of μW within 30 minutes.

Figure 6C:
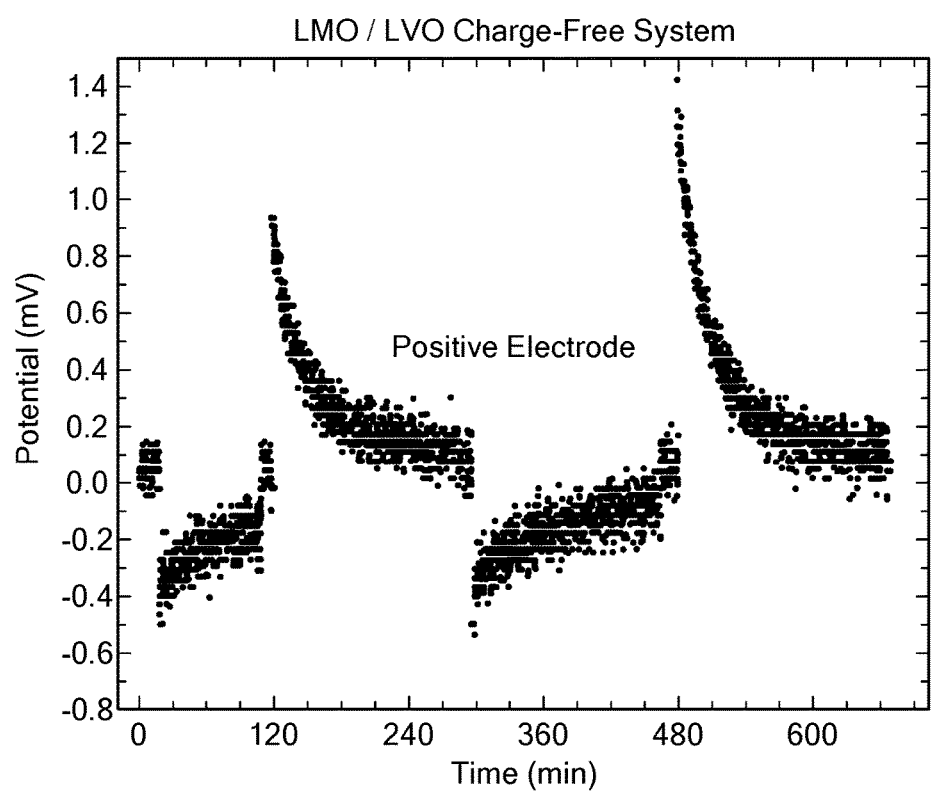

Li$_x$V$_2$O$_5$/Li—Al (LVO) and Li$_x$MnO$_2$/Li—Al (LMO) cells also can be used to demonstrate a single temperature environment system. In a set of experimental measurements, Panasonic VL2020 and ML2430-TT2 cells were wired according to the circuit design above, and the cells were alternated between 10° C. and 50° C. with 100Ω resistors between the cells. As shown in FIG. 6C, the system proved extremely cyclable, while not as power dense (power peaking around 0.01 uW). However, since less than 0.1% of the available capacity was used, much smaller cells could be put in series for the same mass of active material.

Embodiments of the invention may be implemented in part in any conventional computer programming language such as VHDL, SystemC, Verilog, ASM, etc. Alternative embodiments of the invention may be implemented as pre-programmed hardware elements, other related components, or as a combination of hardware and software components.

Embodiments can be implemented in part as a computer program product for use with a computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software (e.g., a computer program product).

Although various exemplary embodiments of the invention have been disclosed, it should be apparent to those skilled in the art that various changes and modifications can be made which will achieve some of the advantages of the invention without departing from the true scope of the invention.

What is claimed is:

1. A thermogalvanic electrochemical system configured to convert environmental heat differences into electrical work, the system comprising:
   a first battery source and a second battery source connected together in a switchable circuit to provide electric current to an electrical load in the switchable circuit, wherein the first battery source and the second battery source are located in a thermal environment varying between a first temperature and a second temperature, and wherein the first battery source and the second battery source are each characterized by a corresponding electrical potential that varies by thermogalvanic effect with the thermal environment; and
   a power management processor employing at least one hardware implemented computer processor to execute program instructions to operate the switchable circuit to:
   (a) form a closed position of the switchable circuit at the first temperature with current flow from the first battery source through the electrical load to the second battery source until reaching a first thermal equilibrium,
   (b) form an open position of the switchable circuit without current flow through the electrical load after reaching the first thermal equilibrium,
   (c) form the closed position of the switchable circuit at the second temperature with current flow from the second battery source through the electrical load to the first battery source until reaching a second thermal equilibrium, and
   (d) form the open position of the switchable circuit without current flow through the electrical load after reaching the second thermal equilibrium.

2. The system according to claim 1, wherein the thermal environment comprises a common thermal environment around both the first battery source and the second battery source with the first temperature and the second temperature varying together in common over time.

3. The system according to claim 1, wherein the thermal environment comprises a dual temperature environment with the first battery source and the second battery source located in separate temperature environments, and wherein the first temperature and the second temperature in each separate temperature environment vary separately and independently over time.

4. The system according to claim 1, wherein the first battery source and the second battery source each comprise a charge-free lithium ion battery.

5. The system according to claim 1, wherein the first battery source and the second battery source are configured to operate as Thermally Regenerative Electrochemical Cycle (TREC) cells.

6. The system according to claim 1, wherein the first battery source and the second battery source are configured to operate as charge-free cells.

7. A computer-implemented method employing at least one hardware implemented computer processor for operating a thermogalvanic electrochemical system to convert environmental heat differences into electrical work, the method comprising:
   operating the at least one hardware processor to execute program instructions to:
   control a switchable circuit connecting together a first battery source and a second battery source so as to provide electric current to an electrical load in the switchable circuit,
   wherein the first battery source and the second battery source both are located in a thermal environment varying between a first temperature and a second temperature,
   wherein the first battery source and the second battery source each are characterized by a corresponding electrical potential that varies by thermogalvanic effect with the thermal environment, and
   wherein controlling the switchable circuit includes:
   (a) forming a closed position of the switchable circuit at the first temperature with current flow from the first battery source through the electrical load to the second battery source until reaching a first thermal equilibrium,
   (b) forming an open position of the switchable circuit without current flow through the electrical load after reaching the first thermal equilibrium, (c) forming the closed position of the switchable circuit at the second temperature with current flow from the second battery source through the electrical load to the first battery source until reaching a second thermal equilibrium, and (d) forming the open position of the switchable circuit without current flow through the electrical load after reaching the second thermal equilibrium.

8. The method according to claim 7, wherein the thermal environment comprises a common thermal environment around both the first battery source and the second battery source with the first temperature and the second temperature varying together in common over time.

9. The method according to claim 7, wherein the thermal environment comprises a dual temperature environment with the first battery source and the second battery source located in separate temperature environments, and wherein the first temperature and the second temperature in each separate temperature environment vary separately and independently over time.

10. The method according to claim 7, wherein the first battery source and the second battery source each comprise a charge-free lithium ion battery.

11. The method according to claim 7, wherein the first battery source and the second battery source are configured to operate as Thermally Regenerative Electrochemical Cycle (TREC) cells.

12. The method according to claim 7, wherein the first battery source and the second battery source are configured to operate as charge-free cells.

\* \* \* \* \*